United States Patent [19]
Soares

[11] Patent Number: 5,710,553
[45] Date of Patent: Jan. 20, 1998

[54] APPARATUS AND METHOD FOR DETECTING OBSTACLES IN A VEHICLE PATH

[76] Inventor: Rogerio Soares, 553 Garfield Ave., Belford, N.J. 07718

[21] Appl. No.: 491,150

[22] Filed: Jun. 16, 1995

[51] Int. Cl.⁶ .................................................... G08G 1/16
[52] U.S. Cl. ........................ 340/903; 340/556; 340/557; 180/167; 250/491.1
[58] Field of Search ........................... 340/942, 903, 340/932.2, 555, 556, 557, 946, 961, 436; 180/167, 199; 250/49.1

[56] References Cited

U.S. PATENT DOCUMENTS

| | | | |
|---|---|---|---|
| 2,554,371 | 5/1951 | Marx | 340/436 |
| 2,834,002 | 5/1958 | Nordsiek | 340/436 |
| 3,269,783 | 8/1966 | Kriz | 340/436 |
| 3,716,833 | 2/1973 | Roth | 340/904 |
| 3,896,414 | 7/1975 | Rulo | 340/942 |
| 4,859,982 | 8/1989 | Seaburg | 340/475 |
| 4,916,429 | 4/1990 | Hicks et al. | 340/942 |
| 4,916,445 | 4/1990 | Crossley | 340/945 |
| 5,276,426 | 1/1994 | LoBello | 340/436 |
| 5,285,205 | 2/1994 | White | 340/932.2 |
| 5,389,912 | 2/1995 | Arvin | 340/903 |
| 5,424,713 | 6/1995 | Thompson et al. | 340/436 |

*Primary Examiner*—Jeffery Hofsass
*Assistant Examiner*—Daniel J. Wu
*Attorney, Agent, or Firm*—Mathews, Collins, Shepherd & Gould

[57] ABSTRACT

The present invention relates to an apparatus and method for detecting when an object is in a path of a vehicle by transversely transmitting a light beam from the uppermost portion of the vehicle towards the object. The light beam contacts the object when the distance to the object from the ground is smaller than the height of the vehicle and the object is in the path of the vehicle. The reflected beam can be observed by a person in the vehicle alerting the person of insufficient clearance for the vehicle. Preferably, the light beam is a collimated beam emitted from a semiconductor laser diode.

13 Claims, 3 Drawing Sheets

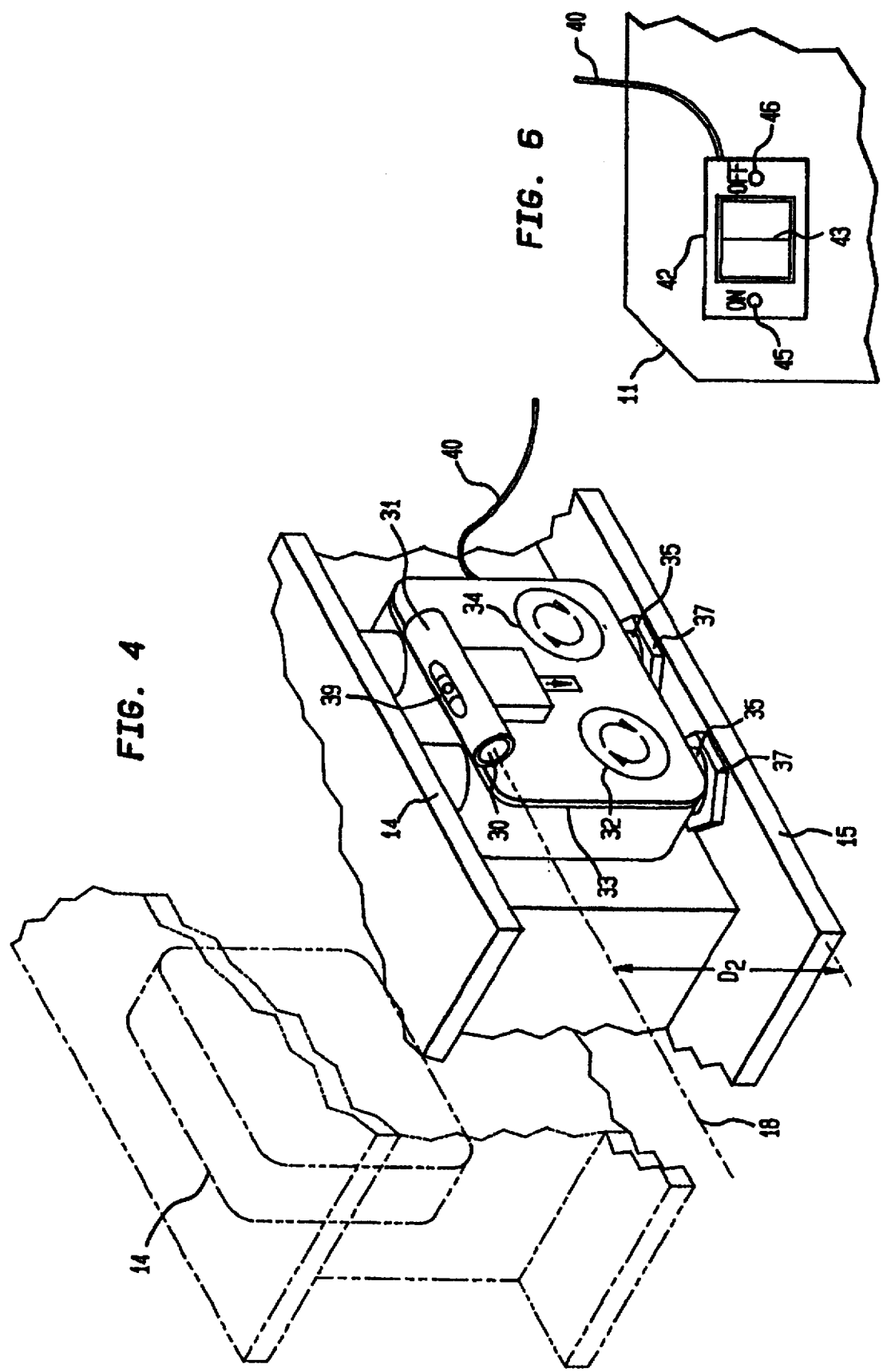

APPARATUS AND METHOD FOR DETECTING OBSTACLES IN A VEHICLE PATH

BACKGROUND OF THE INVENTION

1. Field of the Invention

This invention relates to an apparatus for detecting obstacles in a path of a vehicle in which a laser diode transmits a beam of light that contacts the object and can be observed by a person in the vehicle.

2. Description of the Related Art

Clearance detectors have been proposed for warning a driver of an impending obstruction. U.S. Pat. No. 4,237,446 describes a vehicle clearance detector having an antenna for contacting the obstruction. An elongated spring attaches the antenna to a base. An electric circuit is closed when the spring is deflected in order to activate an alarm. This patent has the shortcoming that the vehicle must be close enough to the object so that the antenna contacts the object. This may result in the operator being unable to stop the vehicle in time, thereby resulting in a collision with the object.

U.S. Pat. No. 4,284,971 ('971 patent) relates to an over-height vehicle detection and warning system in which respective pairs of coordinating light sensors and light sources are spaced in advance of an overhead structure. The respective light beams between the pairs of sensors are broken as a vehicle having excessive overall height passes through the light beam. A signal is sent to a central station which activates a visible flashing electric sign indicating that the vehicle is too high to clear the obstruction and warning the vehicle to stop or exit the thoroughfare.

U.S. Pat. No. 4,477,184 ('184 patent) describes an obstacle detection system having a laser radar mounted on the front end of the vehicle and modulated by pulses of a high rate. The laser pulses are deflected in two orthogonal directions by paired deflection signals fed from a deflection device to paired acoustic optic light deflectors. Paired deflection information is fed to an arithmetic logic means. For a target above the road, the arithmetic logic means calculates its height and provides a decision that passing through thereunder is impossible if the height is smaller than a predetermined height. The '971 and '184 patents have the shortcoming of being overly complex and expensive to manufacture.

Of possible general relevance are U.S. Pat. Nos. 5,212,655 related to a light source illuminating objects on a railroad track, 5,285,205 related to a laser guided positioning system and 3,149,196 related to an optical vehicle guidance system.

SUMMARY OF THE INVENTION

Briefly described, the present invention comprises an apparatus and method for detecting an object in a path of a vehicle in which a light beam is transmitted from the uppermost portion of the vehicle to the object and contacts the object when the object is in the path of the vehicle. The reflection of the light beam on the object is observable by a person within the vehicle. The invention provides for vehicle safety of a vehicle or load carried by the vehicle in relation to roadway overpass clearance. The apparatus is inexpensive to manufacture, rugged in construction, easy to use and efficient in operation.

In the apparatus, a visible light source sends a beam of light transversely from the vehicle. Preferably, the light beam is a collimated beam emitted from a laser diode. The light beam has predetermined characteristics to allow the beam which is reflected from the object to be observable at a distance by a person within the vehicle. The light beam source is mounted on the uppermost portion of the vehicle so that it can be determined that there is sufficient clearance for the entire height of the vehicle to pass under the object. The wavelength of the light beam is in the visible regime preferably, at the optimum wavelength the light beam has a wavelength of 532 nanometers which appears as green light. Red wavelengths of 630 to 670 are also acceptable. Typically, the objects in the path of the vehicle are overhead signs and overpass structures which can be formed of concrete, steel, wood and the like.

An on/off switch positioned in the vehicle can be coupled to the light source for turning on and off the light source. A housing covers the light source for protection when the light source is not operating. The housing can include a movable front panel for exposing the light beam source during operation and covering the light beam source when not in operation. A photodetector is used within the apparatus to determine the light source is on or off in fact on when the on/off switch is in the "on" position.

The apparatus can be magnetically mounted to either the roof of the vehicle or a load carried in the vehicle which has a height greater than the height of the vehicle.

The invention will be more particularly described by reference to the following drawings.

BRIEF DESCRIPTION OF THE DRAWINGS

FIG. 4 is a side elevational view of the apparatus of the present invention.

FIG. 6 is a side elevational view of an on/off switch used with present invention.

DETAILED DESCRIPTION OF THE PREFERRED EMBODIMENT

During the course of this description like numbers will be used to identify like elements according to the different figures which illustrate the invention.

Figure 1:
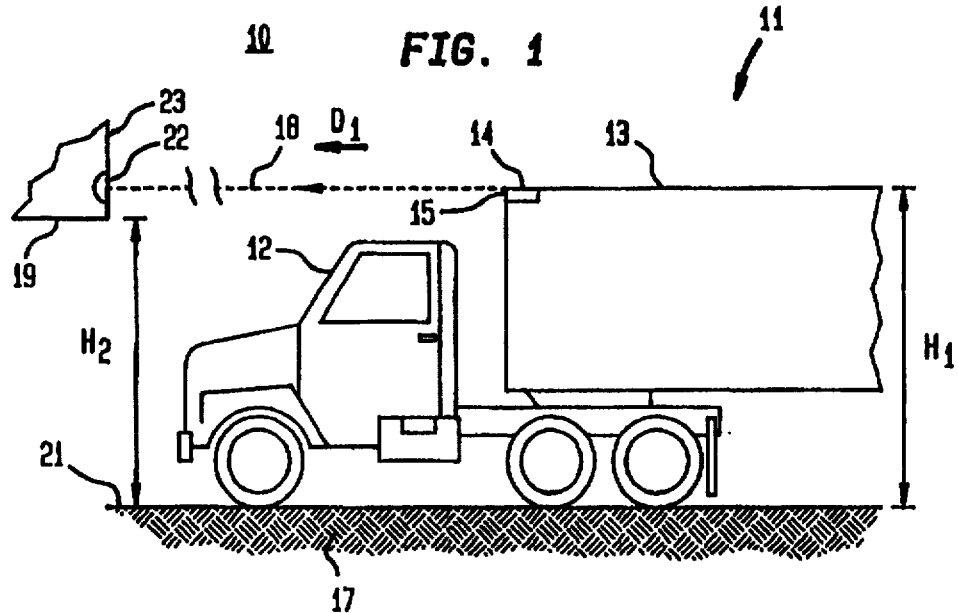
FIG. 1 is a schematic design of the apparatus of the present invention attached to a vehicle.

FIG. 1 illustrates a schematic diagram of an apparatus for detecting an object in a path of a vehicle 10 of the present invention. Vehicle 11 includes passenger cab 12 and trailer 13. Light source 14 is attached to the uppermost portion 15 of vehicle 11. In this embodiment, uppermost portion 15 is positioned on trailer 13 since trailer 13 has a greater height $H_t$ from ground 17 than cab 12.

Light source 14 emits beam 18 in a transverse direction $D_1$ from vehicle 11. Beam 18 contacts an object 19 when object 19 has a height $H_2$ from ground 17 which is smaller than height $H_1$ from ground 17 to the uppermost portion 15 of vehicle 11 and object 19 is in path 21 of vehicle 11. Typically, object 19 is a road overpass structure or an overhead sign which can be formed of concrete, steel, wood and the like. End 22 of beam 18 reflects off surface 23 of object 19 and is visible to the vehicle operator riding in the cab 12. The observation of beam 18 on object 19 indicates insufficient clearance for vehicle 11 under object 19.

Figure 2:
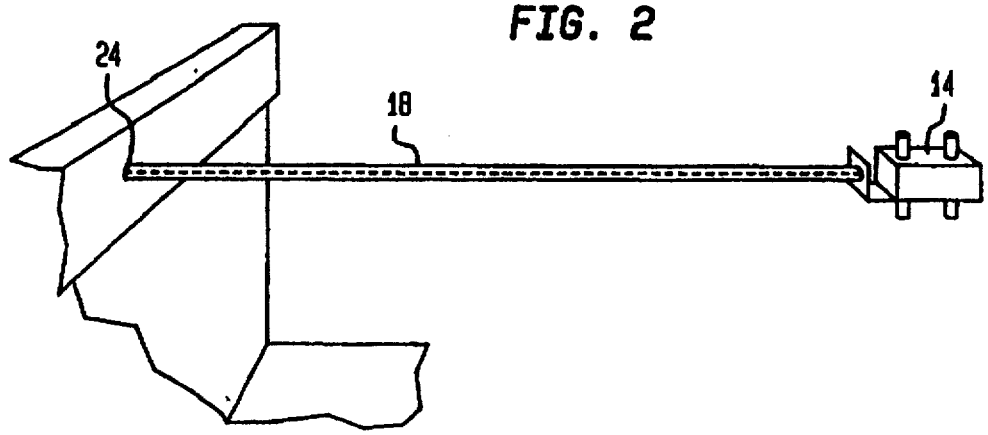
FIG. 2 is a front elevational view of a beam from the present invention impinging an object.

Preferably, beam 18 is a collimated beam of visible light forming a narrow pencil beam. Beam 18 can be of any visible a wavelength. Beam 18 is observable as a reflected circular area 24 on object 19, as shown in FIG. 2. Beam 18 has a diameter is in a range which is large enough to be observable as a reflection on object 19 in path 21 of vehicle 11 and which is small enough to provide precision of the position of reflected circular area 24 on object 19. Typically reflected circular area 24 is about one inch to about 2 inches in diameter which can be easily observed from passenger cab 12. The preferred wavelength is 532 nanometers. The preferred wavelength provides the highest apparent brightness to an observer at the lowest optical power output of light source 14. The collimated beam produces reflected circular area 24 which has substantially the same diameter over a broad range of distances from the light source 14 and object 19. A light source 14 useful for practice of the present invention is a semiconductor laser diode which produces near monochromatic light at the prescribed wavelength. For example, an aluminum gallium indium phosphide laser manufactured by Toshiba produces wavelengths of about 630 to about 670 nanometers. A silicon carbide zinc selenide and gallium nitride laser provides wavelengths in the range of about 500 to about 550 nanometers. These semiconductor lasers can be coupled with a collimating or near collimating optical lens to provide sufficient intensity and beam divergence of beam 18. Reflected circular area 24 can be observed in vehicle 11 at a distance of up to about 300 feet at night and at a distance of about 30 to 300 feet during the day dependent upon ambient light conditions and reflective characteristics of the surface of object 19.

Figure 3:
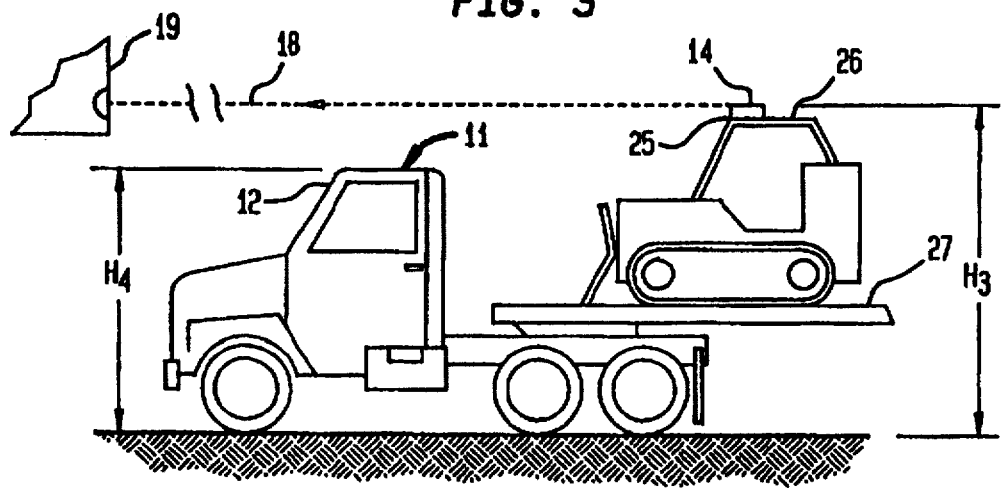
FIG. 3 is a schematic design of the apparatus of the present invention attached to a load of a vehicle.

FIG. 3 illustrates attachment of vehicle detector apparatus 10 to load 26 carried on bed 27 of vehicle 17. Light source 14 is attached to uppermost portion 25 of load 26 of vehicle 11 because the height $H_3$ from the ground to the uppermost portion of load 26 is greater than the height from the ground 17 to the uppermost portion 26 of cab 12.

FIG. 4 is a side elevational view of light source 14. Chamber 30 emits beam 18. Housing 31 covers chamber 30 for protecting chamber 30 from debris and other materials during movement of vehicle 11. Chamber panel 33 is moveable between and open and closed position for covering chamber 30. Chamber panel 33 can be moved with an electrical switch, as are known in the art. Knobs 32 and 34 adjust the height of respective legs 35 and 36 for adjusting the distance $D_2$ between light source 14 and the uppermost portion of the vehicle 15. The height of legs 35 and 36 can be adjusted to correspond to an angle of vehicle 11, with respect to ground 23, for example, if the vehicle is going up or downhill. Light source 14 can be mounted to the top surface 35 of vehicle 11 with magnets 37 attached to legs 35 and 36. Photodetector 39 is positioned within chamber 30 for detecting light emitted from light source 14.

Figure 5B:
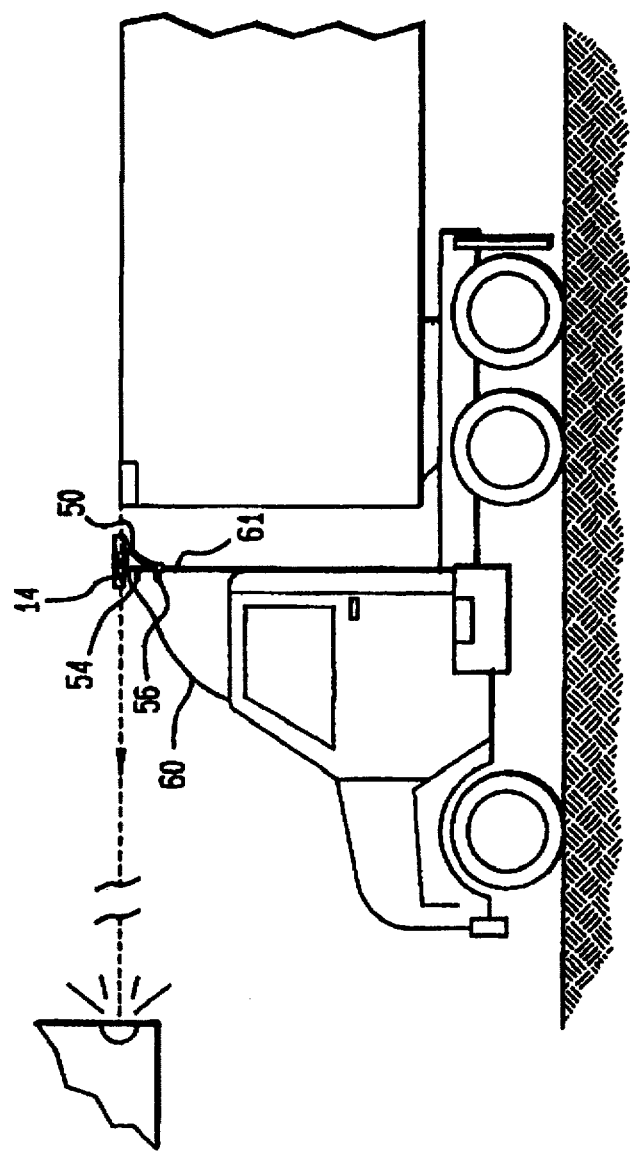
FIG. 5B is a side elevational view of the placement of the bracket mounting the present invention on a cab of a vehicle.
Figure 5A:
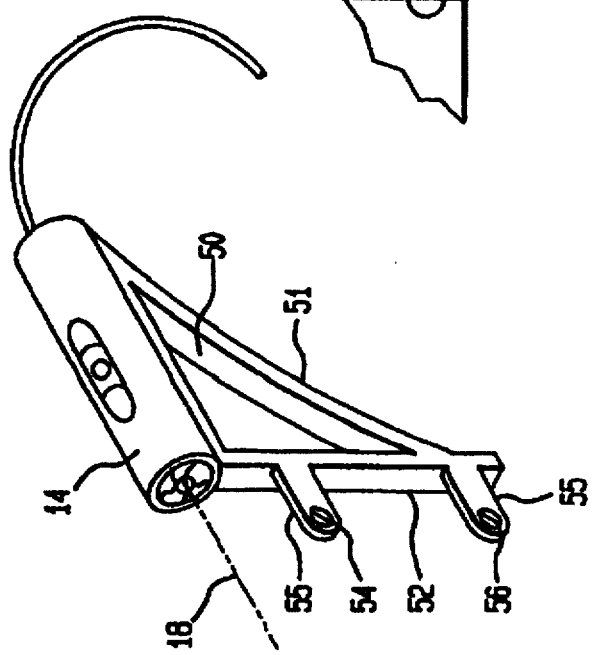
FIG. 5A is a side elevational view of a bracket used for mounting the present invention to a vehicle.

Alternatively, light source 14 can be attached to vehicle 11 with a bracket 50 screwed into vehicle 11 as shown in FIGS. 5A and 5B. In both embodiments, light source 14 is removable from vehicle 11. Legs 51 and 52 support light source 14. Screw member 54 and 56 are coupled to legs 52 with respective protrusions 55. Screw members 54 and 56 can be attached to rear surface 61 of cab 60, as shown in FIG. 5B.

FIG. 6 illustrates an on-off switch which can be used with the present invention connecting wire 40 connects light source 14 to base 42. Base 42 is positioned in cab 12 of vehicle 11. Base 42 includes on/off switch 43 for turning on and off light source 14.

"On" indicator 45 is illuminated when light source 14 emits light and "off" indicator 46 is illuminated when light source 14 does not emit light. The "on" indicator 45 and "off" indicator 46 provide an indication of the operation of light source 14 and removes uncertainty that apparatus 10 is malfunctioning if a user does not observe a reflected circular area 24 of light on an object.

The present invention has the advantage of providing an indication of vehicle clearance using the eyesight of a person in the vehicle and without complex feedback and measurement technology. The present invention detects objects at distances up to about 300 feet at night time and from about 30 to about 300 feet during the day time. The collimated beam of the present invention provides the same reflected circle of light at various distances of the vehicle from the object. A preferred beam wavelength of 532 nanometers provides the highest apparent brightness which can be easily observed when reflected off of an object. A photodetector is used with the light source to indicate that the light source is operational. The apparatus is inexpensive to manufacture, easy to install and uncomplicated to use.

While the invention has been described with reference to the preferred embodiment, this description is not intended to be limiting. It will be appreciated by those of ordinary skill in the art that modifications may be made without departing from the spirit and scope of the invention.

I claim:

1. An apparatus for detecting an object in a path of a land vehicle comprising;

light beam source means for sending a collimated light beam transversely towards said object from said land vehicle, the diameter of said collimated light beam is about constant at all distances; and mounting means for mounting said light beam source means at an upper most portion of said land vehicle;

wherein said light beam contacts the object when said object is in the path of said uppermost portion of said land vehicle and the reflection of said light beam on said object is visually observed by a person in said land vehicle, thereby providing an indication that said object is in said path of said land vehicle to determine if there is sufficient clearance for the height of said land vehicle to pass under said object.

2. The apparatus of claim 1 wherein said light beam source means comprises:

a semiconductor laser diode.

3. The apparatus of claim 1 wherein said mounting means is attached to the roof of said land vehicle.

4. A method of detecting an object in a path of a land vehicle comprising the steps of:

sending a collimated light beam transversely from the uppermost portion of said land vehicle, the diameter of said collimated light beam is about constant at all distances; and visually observing a reflection of the collimated light beam on the object when the object is in the path of said land vehicle, wherein the observation of the reflection indicates that the height of said object is in the path of said land vehicle.

5. The method of claim 4 further comprising the step of:

mounting said light beam on said land vehicle.

6. An apparatus for detecting an object in a path of a vehicle comprising;

light beam source means for sending a collimated light beam transversely towards said object from said vehicle;

mounting means for mounting said light beam source means at an upper most portion of said vehicle; and photo detector means for determining if said light beam is being sent from said light beam source means;

wherein said light beam contacts the object when said object is in the path of said uppermost portion of said vehicle and the reflection of said light beam on said object is observed by a person in said vehicle, thereby providing an indication that said object is in said path of said vehicle.

7. The apparatus of claim 6 wherein said light beam source means is a laser diode and further comprising:

an on/off switch coupled to said laser diode for turning on and off said laser diode, said on/off switch being positioned in said vehicle.

8. The apparatus of claim 7 further comprising:

means for adjusting the angle of said light beam source means.

9. The apparatus of claim 8 further comprising:

a housing positioned over said light beam source means;

said housing having a movable front panel for exposing said light beam during use, wherein said housing covers said light beam source means for protecting said light beam source means.

10. The apparatus of claim 9 wherein the diameter of said light beam is typically in the range of about 1 to about 2 inches.

11. The apparatus of claim 10 wherein the wavelength of the light beam is nominally 532 nanometers.

12. An apparatus for detecting an object in a path of a vehicle comprising;

light beam source means for sending a collimated light beam transversely towards said object from said vehicle, the diameter of said collimated light beam is about constant at all distances; and mounting means for mounting said light beam source means at an upper most portion of said vehicle, said mounting means comprises magnets;

wherein said light beam contacts the object when said object is in the path of said uppermost portion of said vehicle and the reflection of said light beam on said object is visually observed by a person in said vehicle, thereby providing an indication that said object is in said path of said vehicle.

13. An apparatus for detecting an object in a path of a vehicle comprising;

light beam source means for sending a collimated light beam transversely towards said object from said vehicle, the diameter of said collimated light beam is about constant at all distances; and mounting means for mounting said light beam source means at an upper most portion of said vehicle, said mounting means is attached to a load carried on said vehicle;

wherein said light beam contacts the object when said object is in the path of said uppermost portion of said vehicle and the reflection of said light beam on said object is visually observed by a person in said vehicle, thereby providing an indication that said object is in said path of said vehicle.

* * * * *